United States Patent [19]

Hougen

[11] Patent Number: 4,538,944
[45] Date of Patent: Sep. 3, 1985

[54] ANNULAR CUTTER

[76] Inventor: Everett D. Hougen, G-5072 Corunna Rd., Flint, Mich. 48504

[21] Appl. No.: 518,637

[22] Filed: Jul. 29, 1983

Related U.S. Application Data

[63] Continuation-in-part of Ser. No. 303,917, Sep. 21, 1981, abandoned.

[51] Int. Cl.³ .............................................. B23B 51/04
[52] U.S. Cl. ..................................... 408/206; 408/204
[58] Field of Search .............. 408/204, 205, 206, 207, 408/223, 203.5; 125/20; 175/403

[56] References Cited

U.S. PATENT DOCUMENTS

| | | | |
|---|---|---|---|
| 3,308,689 | 3/1967 | MacDonald | 408/204 |
| 3,387,637 | 6/1968 | Ferguson et al. | 408/204 |
| 3,430,526 | 3/1969 | Valenziano | 408/204 |
| 3,592,554 | 7/1971 | Takahara | 408/204 |
| 3,609,056 | 9/1971 | Hougen | 408/204 X |
| 3,610,768 | 10/1971 | Cochran | 408/204 |
| 4,101,238 | 7/1978 | Reibetanz et al. | 408/204 X |
| 4,322,188 | 3/1982 | Hougen | 408/206 |

FOREIGN PATENT DOCUMENTS 2910299 9/1980 Fed. Rep. of Germany ...... 408/204

Primary Examiner—William R. Briggs
Attorney, Agent, or Firm—Barnes, Kisselle, Raisch, Choate, Whittemore & Hulbert

[57] ABSTRACT

An annular cutter having a cylindrical side wall provided with cutting teeth spaced circumferentially around its lower end, the inner periphery of each tooth being radially relieved to provide a narrow margin at the inner side of each tooth directly behind the cutting edge thereof and simultaneously provide a large escape path for chips and an enlarged coolant passageway directly adjacent the cutting teeth.

9 Claims, 5 Drawing Figures

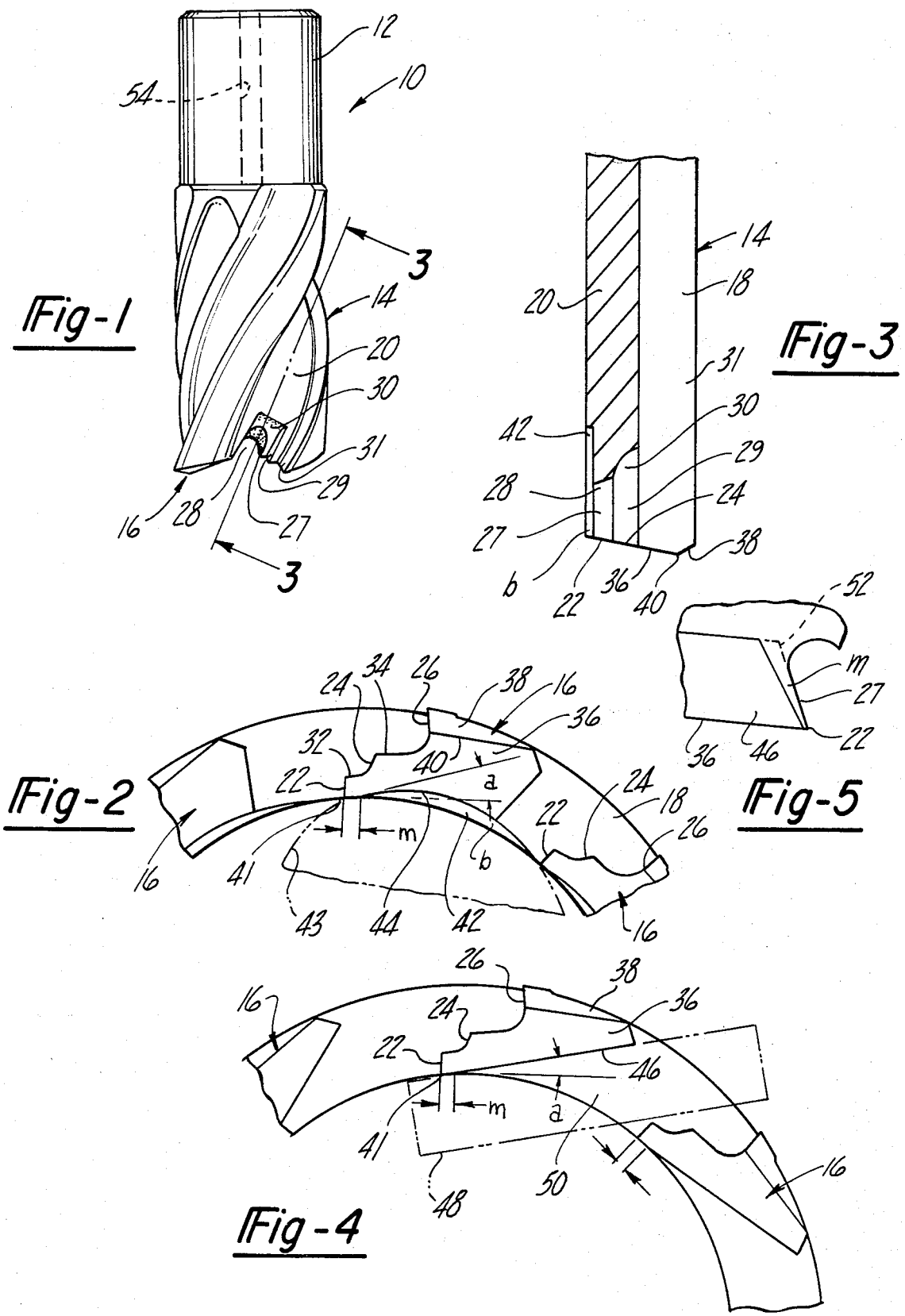

ANNULAR CUTTER

This application is a continuation-in-part of my earlier filed application Ser. No. 06/303,917, filed Sept. 21, 1981 and now abandoned. This invention relates to an annular cutter for forming holes in workpieces.

One of the common problems associated with annular cutters is wear and chipping of the radially innermost edges of the cutter teeth. It has been found that this problem arises from the fact that during a cutting operation metal chips become lodged between the inner periphery of the cutter teeth and the outer periphery of the central slug in the workpiece that is produced by the cutter. These chips build up and become welded to the inner periphery of the cutter adjacent the leading edges of the cutter teeth. The build up of metal at the inner periphery of the cutter teeth creates considerable friction and increases the torque required to rotate the cutter. It also results in the creation of additional heat and produces excess wear which hastens failure of the cutter by chipping and breakage. This chip build up around the inner periphery of the cutter also produces radial loads on the cutter which result in oversized holes with a poor finish and also leads to breakage. It is, therefore, apparent that cutter life can be increased by reducing friction to a minimum and by cooling the cutting edges efficiently.

It is an object of this invention to overcome the problem of wear, chipping, overheating and breakage of annular cutters resulting from build up of chips around the inner periphery of the cutter.

More specifically, it is the object of this invention to form an annular cutter so that the inner periphery of the cutter body has minimum surface contact with the center slug being formed by the cutter.

Another specific object of this invention is to provide a large volume coolant passageway directly adjacent the cutter teeth.

Other objects, features and advantages of the present invention will become apparent from the following description and accompanying drawing, in which:

FIG. 1 is a side elevational view of a cutter according to the present invention;

FIG. 2 is a fragmentary plan view of the lower end of the cutter;

FIG. 3 is a sectional view along the line 3—3 in FIG. 1;

FIG. 4 is a view similar to FIG. 2 and illustrating another embodiment of a cutter according to the present invention; and FIG. 5 is a fragmentary elevational view of one cutter tooth as viewed from the inner periphery of the cutter.

The cutter of the present invention is generally designated 10 and is formed with a shank 12 at its upper end from which an annular side wall 14 depends. The lower end of side wall 14 is formed with a plurality of circumferentially spaced cutting teeth 16. Between the successive teeth 16 the wall 14 is formed with upwardly extending helical flutes 18 which have a radial depth preferably equal to about one-half or less the thickness of wall 14. Thus, each flute 18 is radially juxtaposed to a web 20. In one form of cutter according to the present invention each tooth 16 is formed with three radially extending and circumferentially staggered cutting edges; namely, an inner cutting edge 22, an intermediate cutting edge 24 and an outer cutting edge 26. Cutting edges 22,24 are formed at the lower end of webs 20 and, to accommodate the chips formed thereby, the adjacent portion of the webs is formed with an inner gullet 28 and an outer gullet 30. Cutting edge 22 is defined by the lower end of the trailing face 27 of gullet 28 and cutting edge 24 is defined by the lower end of the trailing face 29 of gullet 30. Cutting edge 26 is defined by the lower end of the trailing face 31 of flute 18. These trailing faces are generally flat and the upper ends of gullets 28 and 30 are somewhat rounded.

Cutting edges 22,24 are interconnected by a circumferential shoulder 32 and cutting edges 24,26 are connected by a circumferential shoulder 34. As shown in FIG. 3, each shoulder 32,34 is formed with a radius where it connects with the next successive cutting edge. These three cutting edges are also vertically or axially staggered by reason of the fact that each tooth is formed with a pair of back-off faces 36,38 which extend circumferentially rearwardly from these cutting edges in an upwardly inclined direction, for example, at an angle of about 8° to 15°. In addition, back-off face 36 inclines radially inwardly and axially upwardly and back-off face 38 inclines outwardly and axially upwardly. These two back-off faces intersect in a crest 40. Depending upon the intended use of the tool, back-off face 36 may incline radially at an angle of +25° to −3°, preferably about 15°, to the horizontal and back-off face 38 may incline radially at an angle of about 5° to 35°, preferably between about 5° to 10°.

The cutting edges 22,24,26 are vertically and/or circumferentially staggered a distance such that each of these cutting edges will cut a separate chip or at least tear the thin web of material which would tend to connect the chips. By reason of the inclination of cutting edges 22,24, both radially and axially, the chips cut by these edges will be directed upwardly through their respective gullets and into flute 18. Likewise, the chip cut by the outer cutting edge 26 will be directed upwardly through the adjacent flute 18 so that all of the chips are discharged smoothly and readily upwardly through the inclined flutes 18.

As shown in FIG. 2, the inner periphery i of wall 14 is relieved radially outwardly from directly behind the line of intersection, designated 41, between the inner periphery of the cutter and the trailing face 27 of gullet 28 to form a clearance space 42 and so as to leave at most a narrow margin m extending circumferentially rearwardly and upwardly from the inner cutting edge 22 of each tooth. In the embodiment shown in FIG. 2 the clearance space 42 is formed by removing metal from the inner periphery of the cutter wall at each tooth by means of a cylindrical cutter or grinding wheel 43 in which case the relieved portion is defined by a segment of a circumferential arc 44. The inner periphery of the cutter is preferably relieved in the more expedient manner illustrated in FIG. 4 where, instead of grinding the relief as an arc at the radially inner face of each tooth, it is ground as a flat surface 46 simply by means of a wheel 48 directed radially through each gullet 28 at a predetermined desired angle. In this case the clearance space 50 is of progressively increasing width in a rearward direction.

The maximum width of margin m should not exceed about 0.040" and should preferably lie in a range of about 0.002 to 0.015". A narrow margin is desirable because it imparts radial stability to the cutter and tends to prevent cutting oversize holes. However, it is not essential to provide a margin on every tooth. If the inner periphery of the cutter is relieved directly to the line of intersection between the inner periphery of the cutter and the trailing face 27 of a gullet 28 (the broken line designated 52 in FIG. 5), there is formed a vertically extending side cutting edge rather than a vertically extending margin. This reduces to a minimum the friction between the inner periphery of the cutter and the central slug produced by the cutter. However, when the cutters are manufactured on a production basis, it is difficult to relieve every cutting edge on every cutter to form such vertical cutting edges so that all will be spaced exactly the same radial distance from the axial center of the cutter as the circular ground margins m. Therefore, it is more practical and certainly desirable to relieve the cutter so as to leave a narrow inner margin on every tooth or at least most of the teeth. The relief may be formed so that the margin tapers from a very small dimension at the axially leading end of the tooth to a progressively greater width in an upward direction. This assures the presence of at least a narrow margin when the cutter is initially manufactured and also after it has been repeatedly sharpened by grinding both the back-off faces and also the gullet faces 27. Thus, as shown in FIG. 5, the margin m may be ground so that initially it has a width at its lower end of about 0.002 to 0.005" and about 0.015" at its upper end. The vertical extent of margins m is preferably slightly greater than the vertical extent of gullets 28 so that the relieved portions 42,50 extend upwardly at least slightly beyond the upper ends of gullets 28.

As pointed out previously, one of the problems involved in using annular cutters of the general type described herein is the lodging of chips between the inner periphery of the cutter wall and the outer periphery of the central slug formed by the annular cutter. The provision of, at most, a narrow margin m in combination with the clearance passageway at the inner side of each tooth substantially eliminates this problem. If a chip becomes wedged between the inner periphery of the cutter and the central slug, the high unit pressure exerted thereon by the narrow margin m or the vertical side cutting edge results in fracture of the chip or at least wearing down of the chip sufficiently so that it will be promptly discharged into the clearance space or passageway and then radially outwardly into the next successive gullet and flute.

From the above explanation it follows that the escape passageways 42,50 must have a sufficient radial dimension to accommodate any chip which enters the clearance space. Normally cutters are designed to be operated at a feed rate that will produce a chip load (chip thickness) up to about 0.005". Therefore, the escape passage should have a radial dimension where it connects with the succeeding gullet of at least this dimension. However, the escape passageway should also have this minimum radial dimension fairly close to the rear edge of the margin so that it is free to escape promptly after it encounters the margin. Experience has shown that where the escape passageway is defined by a surface which inclines radially outwardly at an angle of about at least 3°, and preferably at least 7°, to the tangent at the rear edge of the margin, or the vertical side cutting edge in the absence of a margin, the required 0.005" radial width of the escape passageway occurs sufficiently close to the margin or side cutting edge to provide for the ready discharge of chips therethrough. This angle to the tangent is designated a in FIGS. 2 and 4 and is illustrated as about 12°, which is preferred for the cutter configuration shown in FIG. 4. When the clearance space is formed as an arcuately shaped passageway which has a maximum width intermediate its opposite ends, it is imperative that the discharge end of the passageway have a width of at least about 0.005".

Where the cutter is supplied with a coolant directed downwardly through a central passageway 54 in the shank of the cutter, it is apparent that the clearance passageway provides an additional function; namely, the provision of a large volume of coolant directly adjacent the teeth that now have a mass less than they would otherwise have if the clearance spaces were not provided. While the larger volume clearance spaces may be desirable from the standpoint of efficiently cooling the teeth, care must be taken not to relieve the teeth to an extent that reduces the mass of the individual teeth to a point where they will be inherently weak.

To illustrate the improved results obtained with cutters formed according to the present invention, two cutters were tested under the same conditions and the results obtained are set forth below. Both cutters had an outer diameter of 1-⅞" and were of the general type illustrated in FIG. 1. The cutters were of identical design and dimensions and differed from one another only in that the cutter designated below as "A" had no inside margins and the cutter designated below as "B" had inside margins formed thereon in a manner similar to that shown in FIG. 4, the margins having widths of about 0.002 to 0.005". Both cutters were rotated at 150 R.P.M. to cut holes through a 2" 1018 steel bar.

| Feed Rate Chip Load In./Min. | HP | Thrust | Hole Finish Micro Inches | Slug Finish Micro Inches | Hole Oversize Inches |
| --- | --- | --- | --- | --- | --- |
| CUTTER A | | | | | |
| .002 | 3.6 | 3.6–4.0 | 571 lbs. | 150 | 150 | .005" |
| .003 | 5.4 | 4.8–5.2 | 755 lbs. | 500 | 500 | .009" |
| .004 | 7.2 | 8.0–9.0 | 1123 lbs. | 500 | 500 | .010" |
| CUTTER B | | | | | |
| .002 | 3.6 | 3.5–3.9 | 541 lbs. | 150 | 100 | .0035" |
| .003 | 5.4 | 5.0–5.5 | 757 lbs. | 375 | 250 | .0045" |
| .004 | 7.2 | 6.9–7.5 | 1002 lbs. | 500 | 250 | .005" |
| .005 | 9.0 | 8.6–9.2 | 1185 lbs. | 500 | 375 | .004" |

From the above results the advantages of the present invention are readily seen. In all cases the holes formed with cutter B were substantially less oversize and appeared to have a smooth finish. At the higher feed rates cutter B required less horsepower and less thrust. Cutter A was not tested at a chip load of 0.005" because it was anticipated that the cutter might possibly break under such load.

I claim:

1. An annular cutter having a body provided with a generally cylindrical side wall, said side wall having a plurality of circumferentially spaced teeth around its lower end and a plurality of spiral flutes around its outer periphery extending upwardly from between the successive teeth, each tooth having at least one radially extending cutting edge, there being gullets extending radially outwardly from the inner periphery of the side wall to said flutes between successive teeth to facilitate the discharge of chips cut by said cutting edges radially outwardly and upwardly into said flutes, each gullet having a radially extending trailing face extending upwardly from the radially inner portion of each cutting edge, each tooth having a radially inner back off face inclining downwardly and radially outwardly and an outer back off face inclining downwardly and radially inwardly, said back off faces intersecting in a sharp crest defined by a line which extends circumferentially rearwardly from the front face of each tooth, said crest, when the cutter is rotated and advanced into the surface of a workpiece, initiates the cutting action by forming a V-shaped groove in said surface, the inner periphery of each tooth being relieved in a radially outward direction to provide a circumferentially extending radial clearance space between the inner periphery of the tooth and the central slug formed in the workpiece by the cutter, said clearance space extending rearwardly from a generally vertically extending line spaced rearwardly from the line of intersection of said inner periphery and the trailing face of each gullet, the inner peripheral surface of each tooth between said vertically extending line and said line of intersection forming a margin therebetween having a circumferential width of between 0.002" to 0.040", said margins forming a segments of a cylindrical surface concentric with the central axis of the cutter, the inner periphery of each tooth being relieved such that said clearance space is progressively wider radially in a circumferentially rearward direction and extends rearwardly on each tooth to the next successive rearward gullet.

2. A cutter as called for in claim 1 wherein said clearance space is defined by a generally vertical surface which inclines radially outwardly from said vertically extending line at an angle of at least between about 3° to 7° to the tangent of said inner periphery of said line.

3. A cutter as called for in claim 2 wherein at at least most of said teeth said vertically extending line is spaced rearwardly from said line of intersection to form a margin having a circumferential width of between about 0.002 to 0.015".

4. A cutter as called for in claim 2 wherein said vertically extending line is inclined slightly rearwardly relative to said line of intersection such that said margin is wider at its upper end than its lower end.

5. A cutter as called for in claim 2 wherein said margin is at least co-extensive in height with said line of intersection.

6. A cutter as called for in claim 2 wherein said tooth is provided with a plurality of circumferentially staggered cutting edges, the radially innermost cutting edge being disposed forward in the direction of rotation of the cutter from the next radially adjacent cutting edge.

7. A cutter as called for in claim 6 wherein said vertical surface is flat and inclines radially outwardly at an angle of about 12° to said tangent.

8. A cutter as called for in claim 2 wherein said body has an axially extending coolant passageway therethrough.

9. A cutter as called for in claim 6 wherein said crest extends circumferentially rearwardly from the radially outermost cutting edge.

* * * * *

UNITED STATES PATENT AND TRADEMARK OFFICE
CERTIFICATE OF CORRECTION

PATENT NO. :   4,538,944
DATED      :   September 3, 2985
INVENTOR(S) :  HOUGEN, Everett D.

It is certified that error appears in the above-identified patent and that said Letters Patent are hereby corrected as shown below:

Column 6, Line 15    For "said" read -- each --

[SEAL]

Signed and Sealed this

Twenty-sixth Day of November 1985

Attest:

DONALD J. QUIGG

Attesting Officer    Commissioner of Patents and Trademarks